United States Patent [19]

Tanaka et al.

[11] 3,909,514

[45] Sept. 30, 1975

[54] FACSIMILE COMMUNICATION SYSTEM

[75] Inventors: Yutaka Tanaka, Kadoma; Takamasa Shintani, Tokyo; Sumio Ogawara, Tokyo; Yoshikazu Sekine, Tokyo, all of Japan

[73] Assignees: Matsushita Electric Industrial Co., Ltd.; Matsushita Graphic Communication System, Inc., Japan

[22] Filed: June 21, 1974

[21] Appl. No.: 481,790

[30] Foreign Application Priority Data

June 25, 1973 Japan .............................. 48-71882

[52] U.S. Cl. .............................. 178/6; 178/DIG. 3

[51] Int. Cl.² .......................................... H04N 7/12

[58] Field of Search .......................... 178/6, DIG. 3

[56] References Cited

UNITED STATES PATENTS 3,801,737 4/1974 Komura ........................ 178/DIG. 3

3,830,964 8/1974 Spencer ........................ 178/DIG. 3

*Primary Examiner*—Howard W. Britton

*Attorney, Agent, or Firm*—Robert E. Burns; Emmanuel J. Lobato; Bruce L. Adams

[57] ABSTRACT

Graphical or printed document is scanned with a light-sensitive transducer to generate a one-line signal in synchronism with clock pulses. The one-line signal is sampled into a plurality of binary pulses indicating black and white areas, stored in a first shift register and read out therefrom for comparison with the one-line signal of an adjoining line path. The comparison is made between a group of a predetermined number of the binary pulses of a given line path and the corresponding group of binary pulses of a previous line path to develop a sequence of code signals upon the occurrence of coincidence or non-coincidence therebetween. The code signals are stored in a second shift register, read out for transmission to a receiver station, and simultaneously recirculated for later use. The recirculated code signals are read out for detection of the code signals in order to control the first shift register to transmit necessary group of binary pulses so that video information is transmitted to the receiver station only when a code signal which indicates non-coincidence is detected. A detector is provided which detects the occurrence of a sequence of a predetermined level indicating the background area to develop another code signal regardless of the result of the comparison. The code signals indicating the coincidence or a sequence of the background area, when received at the receiver station, will be used to regenerate the original video information.

26 Claims, 16 Drawing Figures

FACSIMILE COMMUNICATION SYSTEM

The present invention relates generally to a facsimile communications and more particularly to a system using a method of reducing the transmission time and/or bandwidth.

Progress in facsimile and related fields has developed to such an extent that signals derived from graphical and printed or typewritten documents may be economically and accurately transmitted from one location to another. Although the advances in these fields have made possible the development of systems having relatively low cost, ease of operation, and reliability, there remains the need for an increase in the speed of transmission and a reduction in the bandwidth required to saticfactorily transmit a facsimile signal.

Most graphical and printed or typewritten documents include a very substantial amount of redundant information, such as the background or "white" color upon which the contrasting or "black" intelligence information appears. Further, such graphical and printed documents exhibit a considerable degree of spatial correlation. The spatial correlation between signals found between signals found along a single line path is effectively utilized in the prior art system known as run length coding wherein a length of black or white run is coded. The spatial correlation between signals associated with adjoining line paths can be utilized to achieve time-bandwidth compression. Whenever coincidence occurs between such signals, a coded signal is transmitted instead of the actual video signal and is utilized to regenerate the original video signal. The probability of coincidence is intimately related to the number of elemental areas involved for each comparison. If comparison is made of an entire line path, there is less probability of the compared adjoining line paths yielding coincidence. Furthermore, if comparison is made of each elemental areas, the number of coded signals could be prohibitive and such comparison is meaningless. Therefore, compromise must be made between these extremes.

The principal object of the present invention is to provide an improved facsimile system wherein comparison is made of a group of a predetermined number of elemental areas and repeated until all the groups contained in a given line path are compared.

The comparison procedure would require the use of storage devices. However, the present state of electronics technology permits economical utilization of such storage devices and minimization of overall equipment size tp allow widespread commercial use.

Another object of the invention is to provide an improved facsimile system wherein background redundancy is effectively removed by encoding a sequence of the background areas regardless of the comparison.

A further object of the invention is to provide an improved facsimile sytem wherein the encoded signals are transmitted in sequence followed by a sequence of video signals which occur only when there is no coincidence.

In accordance with the present invention, there is provided a facsimile system wherein, at a transmitter station, graphical or printed document is sequentially scanned at a rate of 200 lines/second to generate a sequence of one-line signals. The one-line signal of a given line path is converted into a sequence of 2048 bits of pulses by a sampling method so that each binary pulse represents elemental black or white area. The sampled one-line signal is stored into a video register having 2048 bit positions at a rate of 409.6 kb/s (=2048 b/s × 200), segmented into 128 groups of 16 binary pulses. Each group of 16 bits of the given line path is compared with the corresponding group of a previous line path read out from a video register. A comparator or coincidence circuit is provided which is driven at a rate of 25.6 kb/s, a rate one-sixteenth of the rate at which the video information is being stored into the video register, to provide comparison between such signal groups. The comparison is repeated 128 times to develop a sequence of code elements or signals. When coincidence occurs a first code signal "11" is developed, a second code signal 10 is developed when no coincidence occurs. A detection circuit is provided which detects the occurence of a predetermined level to develop a third code signal 00 when the group of 16 bits of video information represents a sequence of background areas, or white areas, regardless of the result of. the comparison procedure. The code signals are stored into a code register having 128 bits positions in parallel form in synchronism with the comparator. Then, the 128 bits of code signals now stored in the code register are read out for transmission and at the same time recirculated for later use. The read out code signals are preferably further encoded into a form suitable for transmission. Code 00 is encoded into a single bit of 0 and codes 11 and 10 are converted into series form, and transmitted at a signal transmission rate of, for example, 2400 b/s. After the code transmission mode of operation is completed, video transmission mode is initiated during which the recirculated code signals are read out again for detection of code 10 to enable the video register for transmission of the 16 bits of video information of the given line path corresponding to the code 10 and for detection of codes 00 and 11 to disable the video register to prevent transmission of the corresponding 16 bits of video information. During the video transmission mode, the code register is driven at a rate of 76.8 kb/s when code 11 or 00 is detected or at a rate of 150 b/c when code 10 is detected. Meanwhile, the video register is driven at a rate of 1.2288 Mb/s when code 11 or 00 is detected or at a rate of 2400 b/s (transmission rate) when code 10 is detected. Therefore, the video register is driven at a rate of 16 times higher than the code register is driven, while both registers are respectively driven at a rate of 512 times higher when code 11 or 00 is detected than when code 10 is detected. As soon as all the codes are detected, a sequence of video information is transmitted at a rate of 2400 b/s. During the video transmission mode of operation, the video register is recirculated for later comparison with a subsequent line path. The facsimile transmitter of the invention is further provided with a line-all white (background area) detector which detects the occurance of a sequence of 2048 bits of 0s in order to disable the coding procedure, while it develops a sequence of 8 bits of 1s which will be transmitted at a rate of 2400 b/s. The sequence of 2048 bits of 0s is stored in the video register for later comparison with a subsequent line path.

At a receiver station, the sequence of code signals of a give line path is decoded and stored into a code register in parallel form of 128 bits. After storage of the decoded signal, the decoded signals will be read out in sequence to determine what information is to be sotred into a video register which is similar in construction to that at the transmitter. When code 00 is detected, 16 bits of 0s will be read into the video register at a rate of 1.2288 Mb/s while the decoded signal in the code register will be shifted at a rate of 76.8 kb/s to the next position. If code 11 is detected, 16 bits of the corresponding line segment of a previous line path will be shifted from another video register in which the one-line signal of a previous line path is stored. If code 10 is detected, 16 bits of incoming video information will be stored into the video register. During the video read-in mode of operation, the video register of the previous line path is recirculated in synchronism with the video register into which video information of the given line path is being stored. After storage of 2048 bits of video information, the video register will be driven at a rate of 409.6 kb/s to read out the stored information for photoelectrical conversion by a display device which is arranged to scan line paths in synchronism with a clock rate of 200 b/s.

These and other objects, features and advantages of the present invention will be better understood from the following description taken with the accompanying drawings, in which.

Figure 1A:
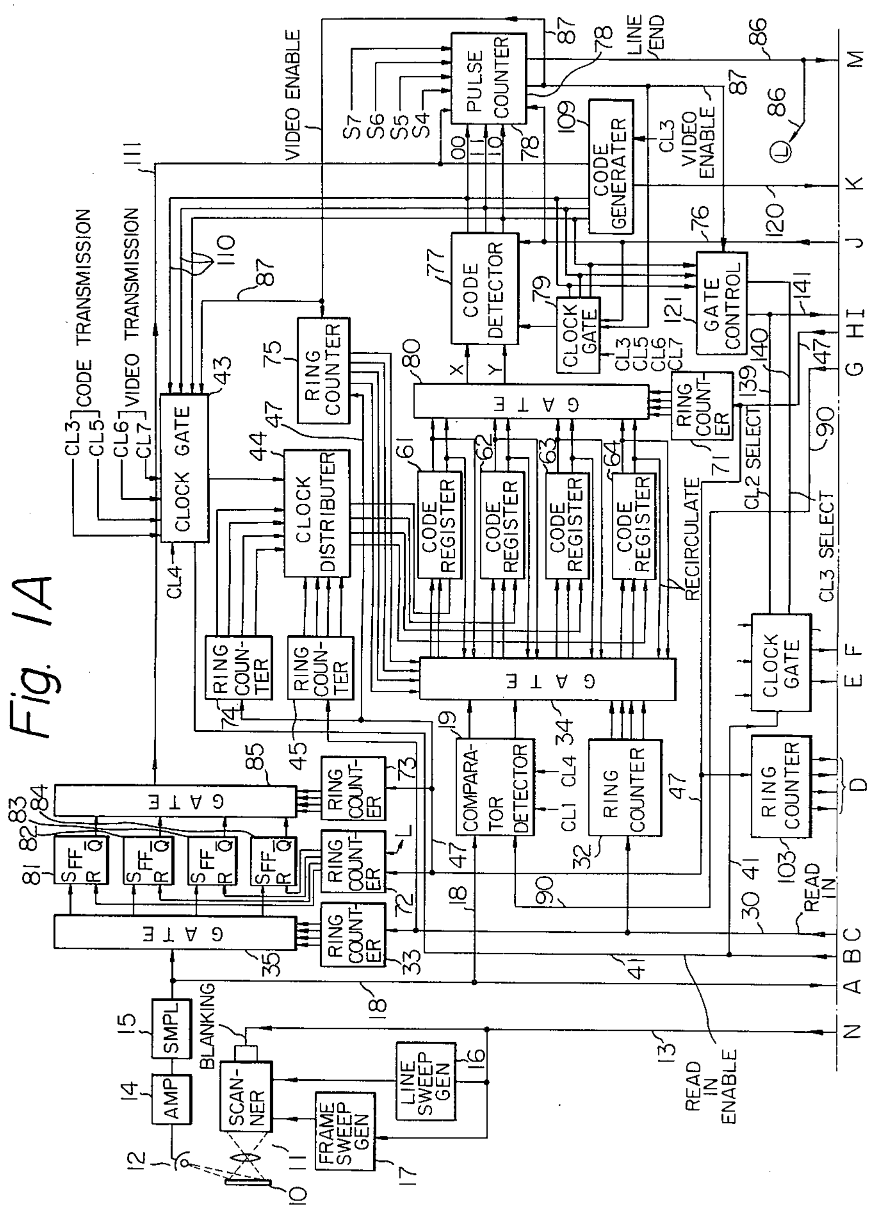
FIGS. 1A and 1B are a circuit block diagram of a transmitter portion of the facsimile system in accordance with the invention.
Figure 1B:
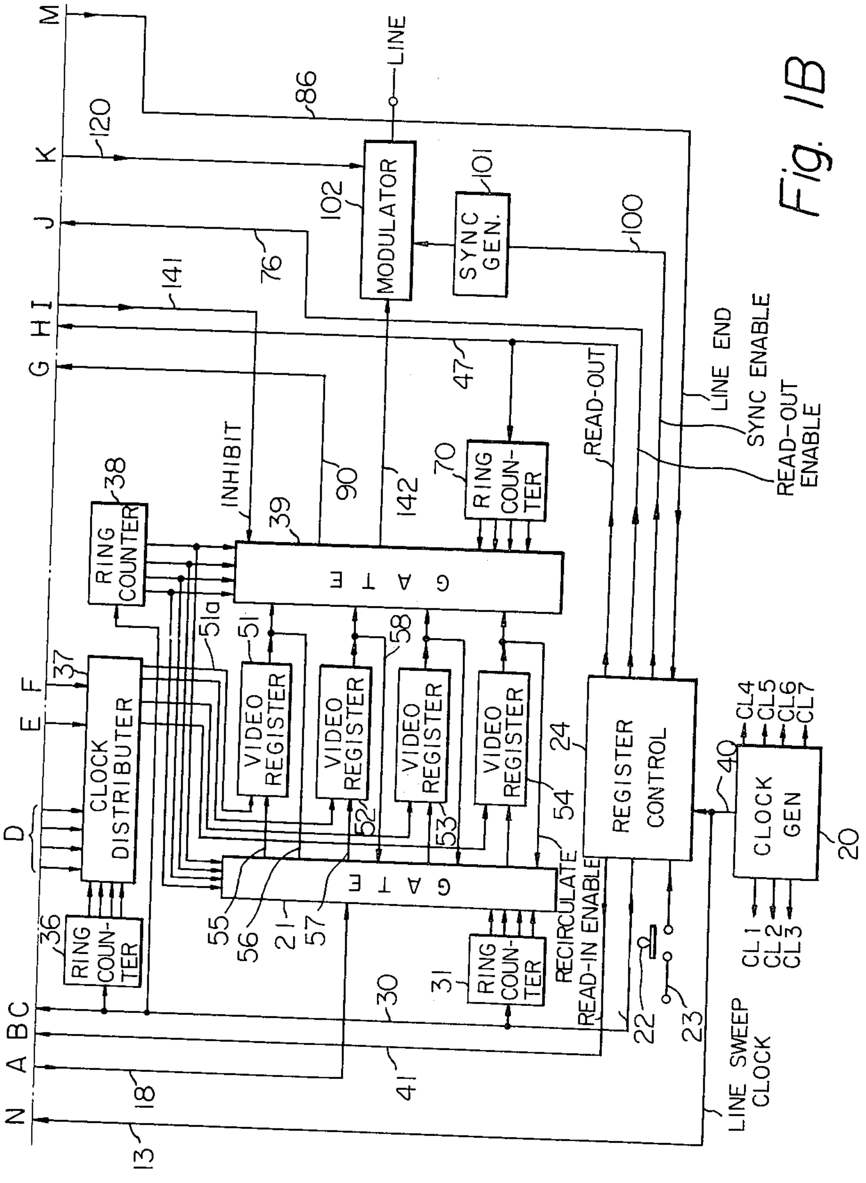
Figure 13:
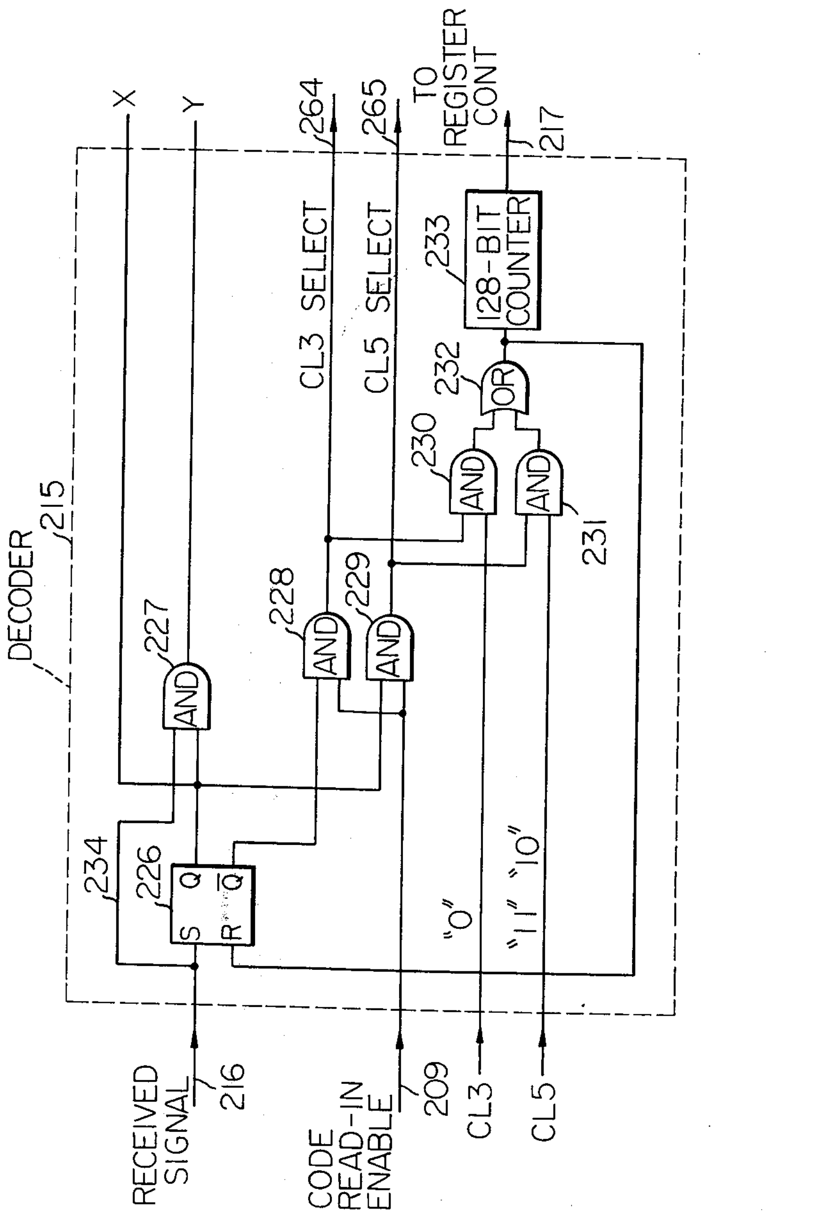
Figure 14:
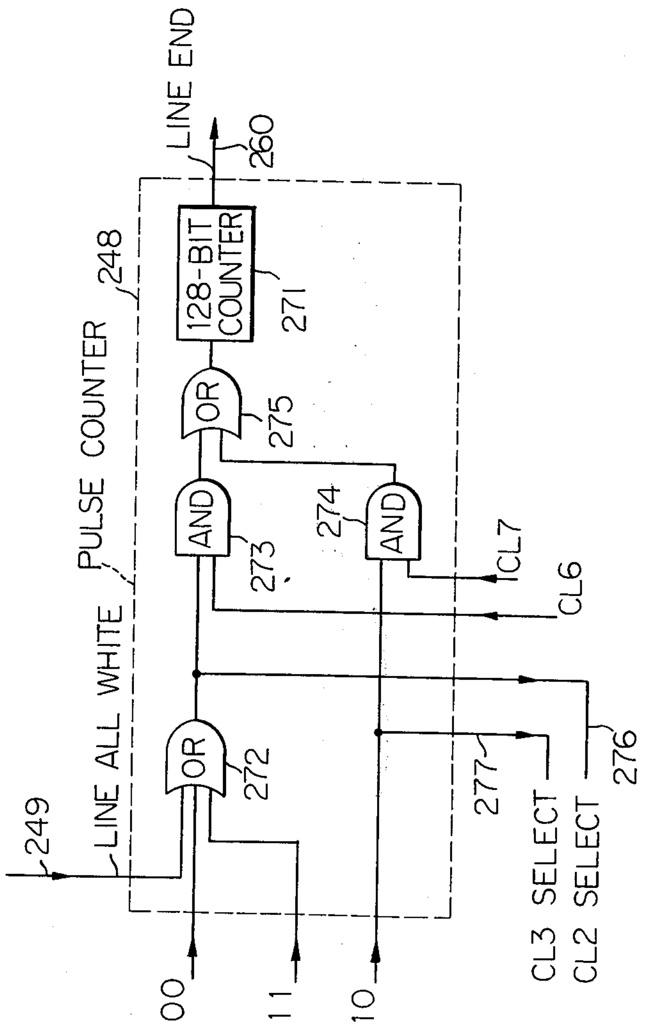

FIG. 13 is a circuit block diagram of a decoder of the receiver of FIG. 10; and FIG. 14 is a circuit block diagram of a pulse counter of the receiver of FIG. 10. Referring now the FIGS. 1 to 9 a facsimile transmitter employed in the facsimile system of the present invention will be described. In FIG. 1, a two-valued object field such as graphical or printed document 10 is scanned in a conventional manner by means of a camera tube or a flying spot scanner 11 with light-sensitive transducer 12 in synchronism with clock pulses (CLO) having a repetition frequency of, for example, 200 pulses/second supplied from a clock pulse generator 20 through line 13. The scanned image on the object 10 is photoelectrically converted into a one-line video signal by the light-sensitive transducer 12 such as phototube or photodiode. The one-line signal is amplified by an amplifier 14 and sampled by a sampling circuit 15 into a train of binary pulses occuring at a rate of 2048 bits per scanning line, the binary pulses representing black and white areas found along the line scanned. A line sweep generator 16 produces a well known sawtooth wave to horizontally deflect the cathode ray beam to scan the line paths within the two-valued object field and a frame sweeo generator 17 deflects the beam vertically at a rate depending on the resolution of the image desired. Since the vertical scanning is usually done at a much slower rate than the rate at which the line scanning is carried out, electronic frame scanning may be replaced with a mechanical means. Further, the scanning arrangement as described above including the sampling circuit 15 may be replaced with a digital scanner using an array of shift registers coupled with an array of photodiodes driven by clock pulses.

Figure 2:
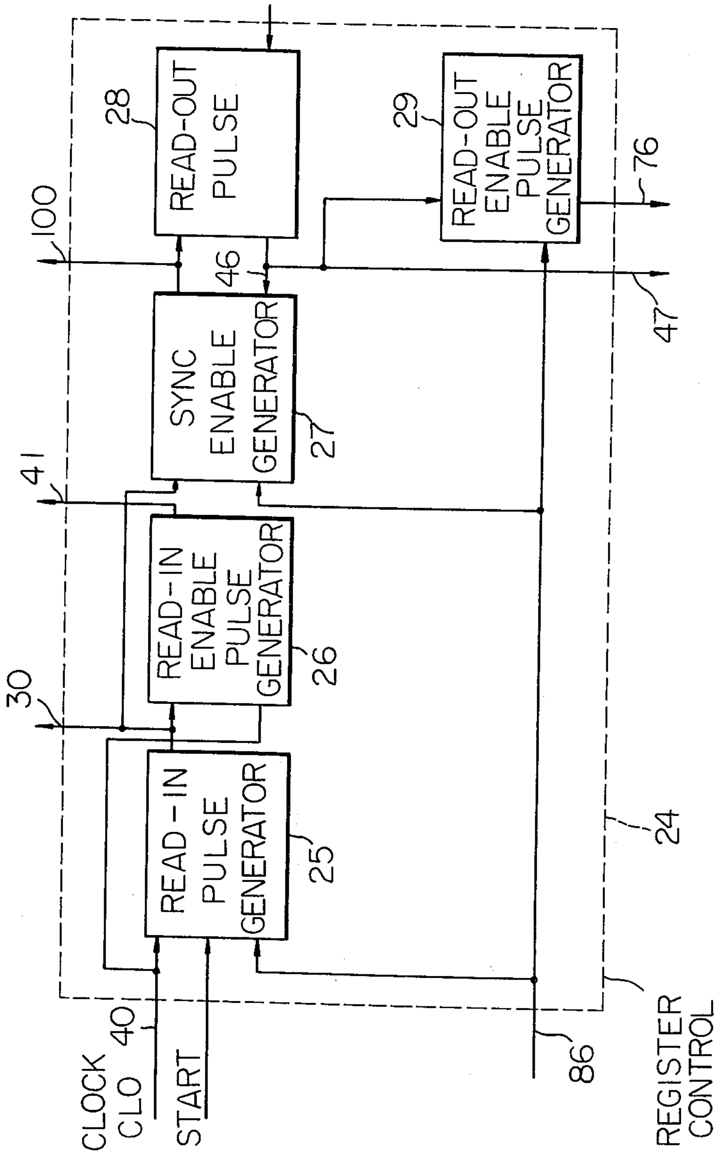
FIG. 2 is a schematic circuit diagram of a register control circuit employed in the transmitter of FIG. 1.
Figure 3:
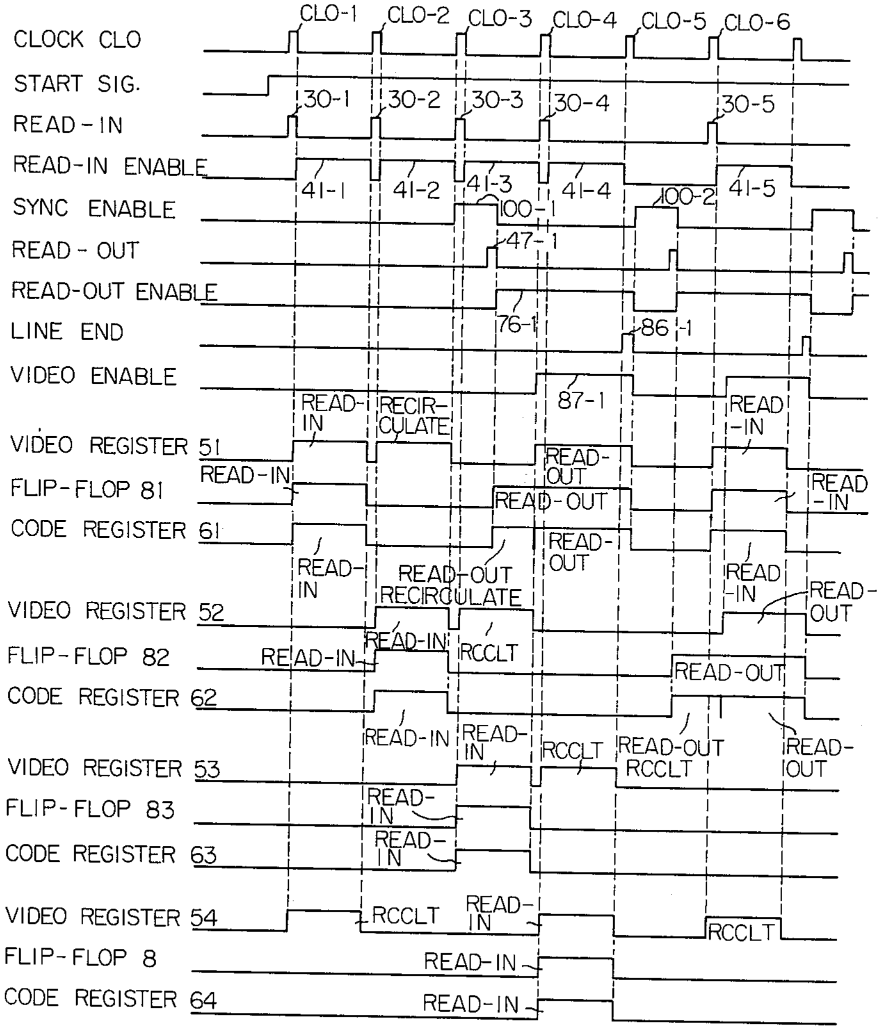
FIG. 3 is a timing diagram for various signal waveforms of the transmitter of FIG. 1.

The facsimile transmitter generally comprises a register control circuit 24 which generates a plurality of timing pulses driven by clock pulses CLO at a rate of 200 bits/sec and is actuated upon energization of lead 23 by manual operation of START switch 22. In FIG. 2, the register control circuit 24 comprises a read-in pulse generator 25 which is energized upon coincidence between the clock pulse CLO supplied from clock pulse generator 20 and the manually grounded start signal and generates a read-in pulse in synchronism with the clock pulse CLO. The read-in pulse is applied on lead 30 to ring counters 31, 32 and 33 in order to selectively provide access circuits in gate circuits 21, 34 and 35 and to ring counter 36 and 45 to select a desired clock pulse supplied to clock distributors 37 and 44, and further to another ring counter 38 to selectively energize gate circuits 21 and 39. A read-in enable pulse generator 26 is provided in the register control circuit 24 having one of its input circuits coupled to lead 40 and the other input circuit to the output circuit of the read-in pulse generator 25. A read-in enable pulse so generated 26 rises at the trailing edge of the read-in pulse and falls at the leading edge of the clock pulse CLO as shown in FIG. 3. The read-in enable pulse is applied on lead 41 to clock gate circuits 42 (FIG. 1B) and 43 (FIG. 1A) to selectively gate on clock pulses CL1 and CL4 through clock distributors 37 (FIG. 1B) and 44 (FIG. 1A), respectively, to selectively energize a plurality of video registers 51 to 54 and a plurality of code registers 61 to 64, respectively. The clock distributor 37 provides clock access paths to video registers 54 and 51 upon the first occurence of the read-in pulse 30-1 (FIG. 3), then shifts the access paths to video registers 51 and 52 upon the second occurence of the pulse 30-2, and then shifts them to registers 52 and 53, and so on. In the register control circuit 24, a synchronization enable pulse generator 27 is provided having one of its input circuits coupled to the output circuit of the read-in pulse generator 25 to generate a pulse which occurs at the rising edge of a first occuring read-in pusle after the count of two. The sync enable pulse is supplied to a read-out generator 28 which starts counting a predetermined number of clock pulses CL3 (2400 b/s) and produces a read-out pulse 47-1 at the end of the count and energizes the sync enable generator 27 on lead 46 (FIG. 2). The energization of lead 46 causes the sync enable pulse 100-1 to fall which in turn will cause the read-out pulse 47-1 to fall at the trailing edge of the sync enable pulse (FIG. 3). The read-out pulse thus determines the duration of the sync enable pulse and at the same time serves as an information read-out pulse which will be delivered on lead 47 to ring counters 70 to 75 for selection of video and code registers through gate circuits 39 and 80, respectively, and for selection of line-all white flip-flops 81 to 84 through gate circuit 85 and for clock distribution by clock distributor 44 to supply associated clock to the selected code register and, in addition, for establishing a recirculating circuit coupling the output and input of code register through the input gate circuit 34. the register control circuit 24 further comprises a read-out enable pulse generator 29 which produces a read-out enable pulse 76-1 at the trailing edge of the read-out pulse 47-1 and energizes lead 76 (FIG. 1B) to start code detection mode of operation after the code register has been selected. The read-out enable pulse energizes a code detector 77, a 2048-bit pulse counter 78 and a clock gate 79 (FIG. 1A) which delivers a desired clock to the code detector 77. After the count of 2048 bits, the pulse counter 78 delivers a line-end pulse 86-1 on lead 86 to the read-in pulse generator 25, sync-enable pulse generator 27 and to read-out enable pulse generator 29 of the register control circuit 25, whereupon the read-out enable pulse 76-1 falls to the zero voltage level. After occurence of a first sync enable pulse 100-1, the sync enable pulse generator 27 generates subsequent pulses at the falling edge of each of the line-end pulses. Similarly, after the count of the first four clocks CLO-1 to CLO-4, the read-in pulse generator 25 produces a read-in pulse 41-5 in synchronism with a clock pulse CLO-6 after occurence of the line-end pulse 86-1.

Figure 4:
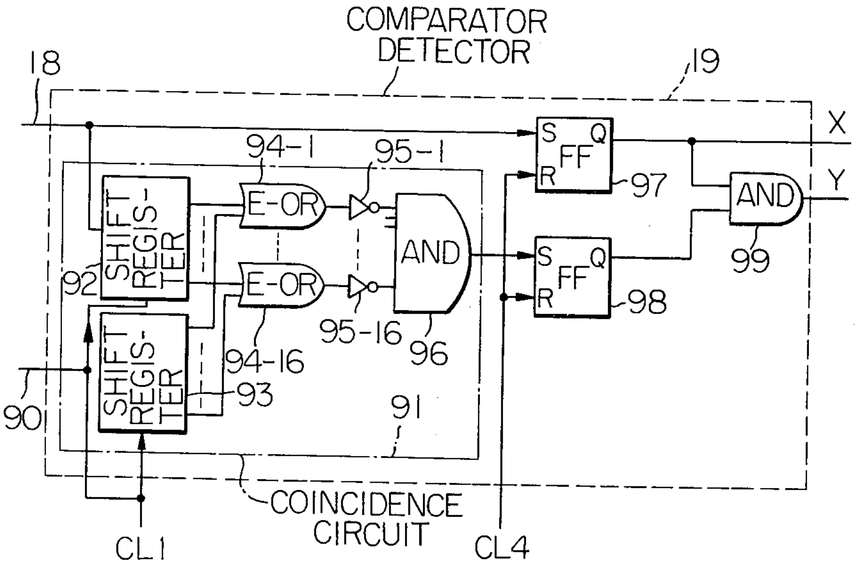
FIG. 4 is a circuit block diagram of a comparator detector of the transmitter of FIG. 1.

With the video signal being applied on lead 18 and the register control circuit 24 being energized upon actuation of START switch 22, the facsimile transmitter starts to read in the sampled video signal into video register 51. Upon the first read-in pulse 30-1 applied on lead 30, the ring counter 31 energizes one of its output circuits to selectively energize the input gate circuit 21 so that signal on lead 18 gains access to the input circuit 55 of the video register 51. Each of the video registers 51 to 54 comprises a 2048-bit shift register to store a complete one-line signal. At the same time, ring counter 32 (FIG. 1A) also energizes the gate circuit 34 to provide an access circuit between the output circuits of the comparator/detector 19 and the input circuits of the code register 61. Also, ring counters 36 (FIG. 1B) and 45 (FIG. 1A) permit clock distributors 37 and 45, respectively, to set up access circuits for desired clocks to be applied to video registers 51 and 54 and code register 61, respectively. The register control circuit 24 produces a read-in enable pulse 41-1 on lead 41 in a manner as described above upon occurence of the read-in pulse 30-1. The read-in enable pulse 41-1 energizes the clock gate 42 (FIG. 1A) to select clock CL1 which occurs at a rate of 409.6 kb/s and the clock gate 43 (FIG. 1A) to select clock CL4 which occurs at a rate of 25.6 kb/s (which is equal to one-sixteenth of the rate of clock CL1). With clock CL1 being applied on lead 51*a*, the video register 51 sequentially reads in the video pulses on lead 55 at the rate of 409.6 kb/s. Therefore, a complete one-line video signal is read in within a period of 1/200 seconds in synchronism with the line scanning. Simultaneously video register 54 is shifted at the same clock rate. The read-in pulse 30-1 is also applied to ring counter 38 (FIG. 1B) to energize one of its output circuits which connect to the input gate circuit 21 to provide a recirculating circuit which couples the output and input of the video register 54 in which a one-line signal of a previous line path is stored. The video register 54 is shifted at the same clock rate as the video register 51 is shifted so that the stored bits therein are read out therefrom to be applied to the comparator/detector 19 and at the same time recirculated therein for later transmission of the recirculated bits. In addition, the ring counter 38 energizes the output gate circuit 39 to provide a path for the recirculated bits of information to gain access to lead 90 which connects to one input circuit of the comparator/detector 19 to which the video signal of the first line path is also supplied. It is to be noted that since during the first line scan, there is no information stored in the video register 54, a train of 2048 bits of low level signal or 0s is read out from the video register 54 at a clock rate of 409.6 kb/s and thus fed into the comparator/detector 19 in exact synchronism with the video pulses applied thereto. In FIG. 4, the comparator/detector 19 comprises a coincidence circuit 91 having shift registers 92 and 93 with their input circuits coupled to the video input lead 18 and another input lead 90. Each of the shift registers 92, 93 is a 16-bit shift register having the corresponding bit positions thereof being coupled in pairs to the input of "Exclusive-OR" gates 94-1 to 94-16, the Exclusive-OR gates 94-2 to 94-15 being omitted for simplicity, and driven by clock CL1 to read in the input pulses at a rate of 409.6 kb/s. Each of the Exclusive-OR gates compares the state of the corresponding bit positions of the two shift registers 92 and 93 and delivers a low level, or 0 output to inverters 95-1 to 95-16 whenever coincidence occurs between the corresponding 16 bits supplied into the register 92 and 93. The 0 output is inverted by the inverters and applied to an AND gate 96 which applies a 1 output on lead Y only when coincidence occurs. On the other hand, the video signal is applied to the set terminal of a flip-flop 97 bypassing the coincidence circuit 91. If the video signal stored in the shift register 92 contains a bit 1, the flip-flop 97 will cause its Q to go high. If such conditions exist, that is, the stored bits contain bit 1 and coincide with the corresponding bits of the previous line path, code 11 is delivered on leads X and Y. If the stored bits contain bit 1 and the coincidence circuit produces 0 output (no coincidence). code 10 will be delivered on the X and Y leads. If the stored bits are a sequence of all 0 bits, code 00 appears on the X and Y leads regardless of the output of the coincidence circuit 91. The flip-flops 97 and 98 are driven by clock pulses CL4 which occurs at a rate one-sixteenth of the rate at which the shift registers 92 and 93 are driven, so that one code is generated at each comparison between 16 bits of incoming and read out information. The comparison is repeated 128 times to generate a sequence of 128 code signals. The output of the comparator 19 is delivered and stored into the code register 61. Each of the code registers 61 and 64 comprises a pair of parallel-connected 128-bit shift registers to store the code signals in parallel form.

Energization of lead 30 by the read-in pulse 41-1 also energizes the gate circuit 35 (FIG. 1A) to allow the video signal appearing on lead 18 to gain access to a flip-flop 81 which evidently corresponds to the code register 61 and to video register 51. Each of the flip-flops 81 to 84 remains unchanged when a low level pulse (0) is applied to the set (S) terminal thereof and the $\overline{Q}$ output thereof maintains high level. If a given line path contains all white areas which results in generation of 2048 bits of 0s, the $\overline{Q}$ output of the flip-flops remains high and a 1 output is delivered at the end of a line scan driven by a read-out pulse on lead 47 as will be described hereinbelow. At the end of the first line scan, the video register 51 is filled with 2048 bits of the video signal, the code register 61 is filled with 128 bits of codes and the flip-flop 81 functions to detect the occurence of all 0 bits in the one-line video signal.

Upon the second clock pulse CLO-2, a second read-in pulse 30-2 appears on lead 30 to cause the associated ring counters to advance their points of energization to the next position, whereupon video register 52, code register 62 and flip-flop 82 are selected for storage of a one-line signal of the next line path. At the same time, the ring counter 38 causes the gate circuit 21 to shift the recirculating circuit from the video register 54 to video register 51 and the video signal stored in the register 51 is recirculated through lead 56 to lead 55 at the clock rate CL1 for transmitting the recirculated video signal in later stage, and at the same time causes the output gate circuit 39 to set up output access for the video signal being recirculated to output lead 90 for comparison with the next one-line signal. The first one-line signal is thus read out from the video register 51 and applied to the comparator/detector 19 and compared with the one-line signal of the second line path which appears on lead 18. The same procedures as described above are repeated for the second one-line signal which will be stored in video register 52 until the start of a third clock pulse CLO-3 whereupon a sync enable pulse 100-1 is generated by the register control circuit 24 as previously described. The sync enable pulse 100-1 is applied on lead 100 to a sync generator 101 which generates a synchronization pulse to be transmitted to a receiver station over a transmission channel through a modulator 102.

Upon occurence of the sync enable pulse 100-1, a read-out pulse 47-1 is generated in the register control circuit 24 as described above and applied on lead 47 to ring counters 70, 71, 103, 72, 73, 74 and 75 for clock distribution and signal path selection in a manner similar to that described with reference to the read-in pulse. The ring counter 75 (FIG. 1A) serves to provide a recirculate signal to the gate circuit 34 so that the output and input circuits of the code register 61 are connected in pair through the gate circuit 34. The ring counter 71 (FIG. 1A), on the other hand, energizes the gate circuit 80 to provide access for the code register 61 to code detector 77, and the first bits in pair of the stored 128 bits of code appears at the XY inputs of the code detector 77.

Figure 5:
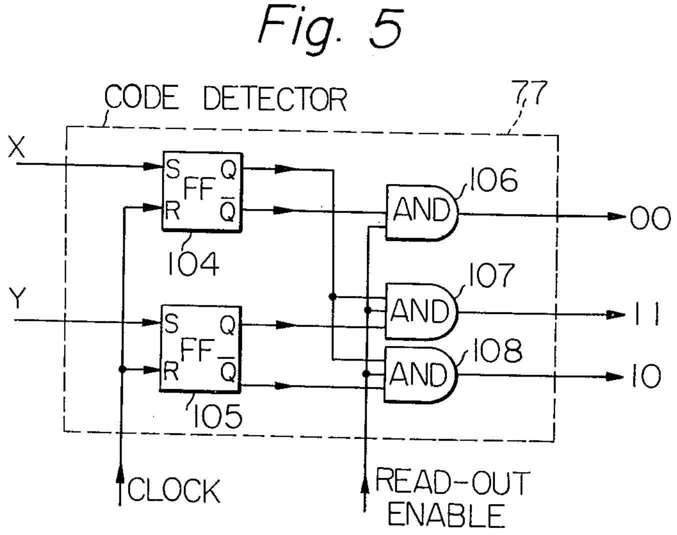
FIG. 5 is a circuit block diagram of a code detector of the transmitter of FIG. 1.

In FIG. 5, the code detector 77 comprises flip-flops 104 and 105 coupled to the X and Y input leads, respectively, and AND gates 106 to 108. If the first paired bits are 00 on XY leads, the AND gate 106 energizes its output producing 1 output on lead designated by 00 upon coincidence with a read-out enable pulse 76-1 which will be described. In the case of 11 only AND gate 107 is energized to produce 1 output to the lead 11, and in the case of 10 only AND gate 108 is energized to produce a 1 output to the 10 lead. At the falling edge of the read-out pulse 47-1, the read-out enable pulse 76-1 as referred to above is generated in the read-out enable generator 29 of the register control circuit 24 and applied on lead 76 to the code detector 77 and clock gate 79, and as referred to above the ccode detector 77 detects the occurence of the first code. The appearance of the first code on one of the output circuits of the code detector 77 energizes one of the input circuits 110 to clock gate 43 so as to select one of the clocks CL3, CL5 (CL6 and CL7 will be selected in a later stage of operation). If the first code is 00, clock CL3 will be selected which occurs at a rate equal to a signal transmission rate of, for example, 2400 bits/-seconds. If the first code is either 11 or 10, the clock CL5 will be selected which occurs at half the rate of CL3, i.e., 1200 bits/second. The difference between the two clocks CL3 and CL5 is due to a further coding of these codes by a code generator 109 which is a parallel-to-series encoder wherein code 00 is translated into a single bit of 0 which will be actually transmitted, while the other codes are translated into 11 and 10 codes in series form. One of the clocks CL3 and CL5 is supplied through the clock distributor 44 to the code register 61 to shift the first code at the selected clock rate. This process is repeated until all the 128-bit codes stored in the code register 61 have been read out at different rates according to the code detected by the code detector 77. The code detector 77 delivers its output at a rate determined by clock CL3 or CL5 supplied from clock gate 79 in synchronism with the input code. While the stored codes are read out through the output gate circuit 80, the stored codes are also recirculated through the recirculating circuit as referred to above for later use in redetection thereof by code detector 77 to provide control signals to video register 51 for selective transmission of the video signal stored therein.

Figure 6:
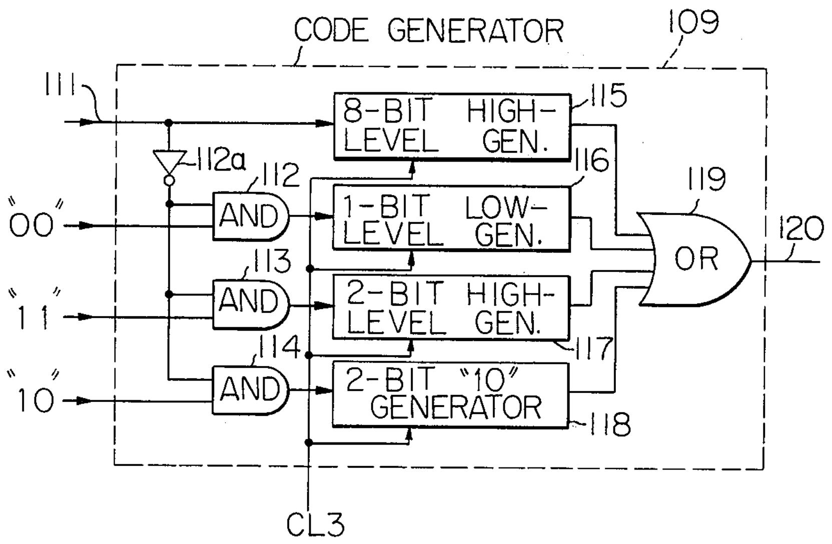
FIG. 6 is a circuit block diagram of a code generator of the transmitter of FIG. 1.

In FIG. 6, the code generator 109 comprises a plurality of pulse generators 115 to 118 and a plurality of AND gates 112 to 114. The 1-bit low-level generator 116 generates a single bit of 0 upon energization of the 00 input lead connected to the AND gate 112, the 2-bit high-level generator 117 produces 2 bits of 1 in sequence upon energization of the 11 input lead coupled to the AND gate 113, and the 2-bit 10 generator 118 produces 10 bits in sequence upon energization of the 10 input lead coupled to the AND gate 114. The 8-bit high-level generator 115 is used to generate 8 bits of 1 upon energization of lead 111 which is coupled to the output gate circuit 85 (FIG. 1A) through which a line-all white signal will be generated as will be described later. The inverter 120 is employed for inhibiting the AND gates 112 to 113 whenever a one-line white signal is impressed upon lead 111. The code thus translated into series form is delivered through OR gate 119 over lead 120 to modulator 102 and transmitted over transmission channel at a transmission rate of 2400 b/s (CL 3). After all the 128 bits of code of the first line path stoed in the code register 61 are again detected by the code detector, translated by the code generator and transmitted over the transmission channel, the next sequence of action will be commenced for transmitting the video signal portion of the first line path now stored in the video register 51.

Figure 7:
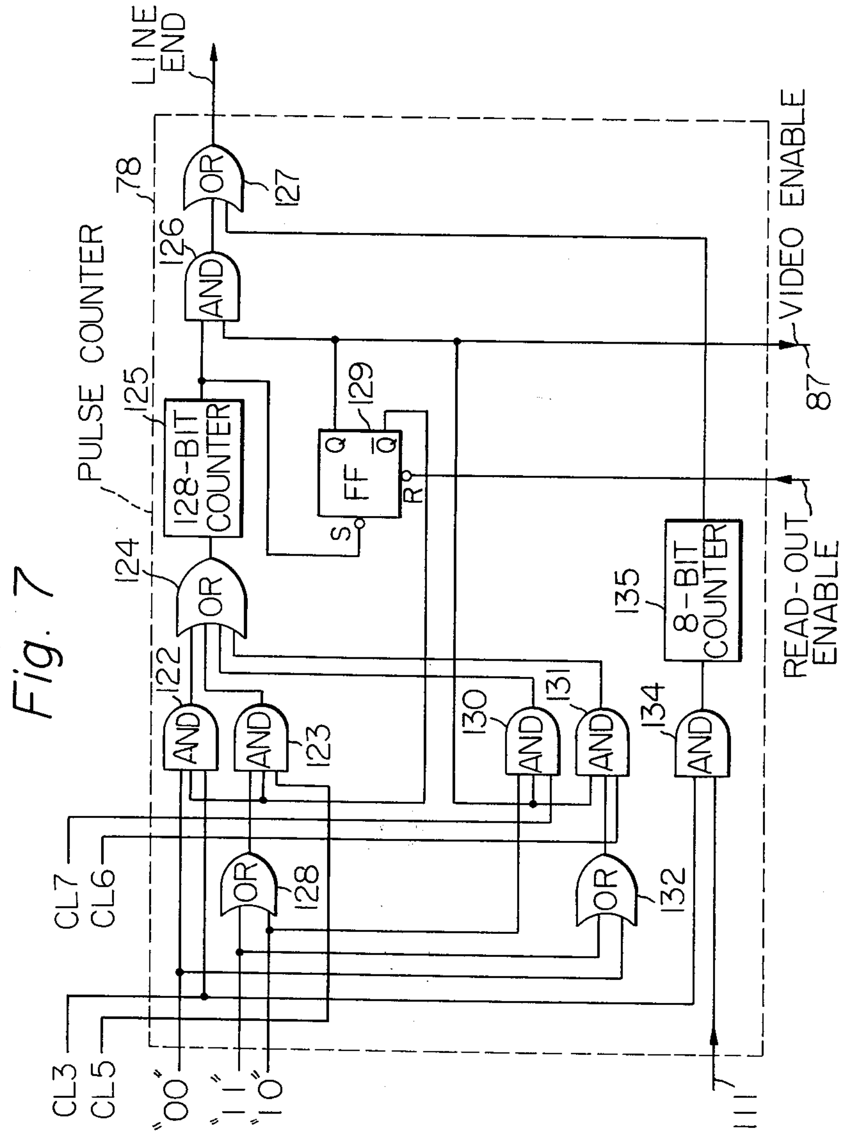
FIG. 7 is a circuit block diagram of a pulse counter of the transmitter of FIG. 1.

To determine when to commence the next circuit action, a pulse counter 78 is provided to count the pulses supplied from the code detector 77 over leads 00, 11 and 10 and a one-line white signal on lead 111 (FIG. 7). Code 00 is counted by a 128-bit counter 125 when coincidence occurs in an AND gate 122 with a clock pulse CL3 and the read-out enable pulse 76-1, which resets flip-flop 129 producing a high level $\overline{Q}$ output to AND gate 126. Codes 11 and 10 are counted when coincidence occurs in an AND gate 123 between either of 11 and 10 inputs and a clock pulse CL5. As soon as the count of 128 bits is completed, the 128-bit counter 125 produces an output to the flip-flop 129 which changes its state producing high level output on the Q output terminal thereof. Therefore, a video enable pulse 87-1 is generated on lead 87 which will be applied to the gate control 121 and the clock gate 79, as well as to ring counter 75 and clock gate 43.

Figure 8:
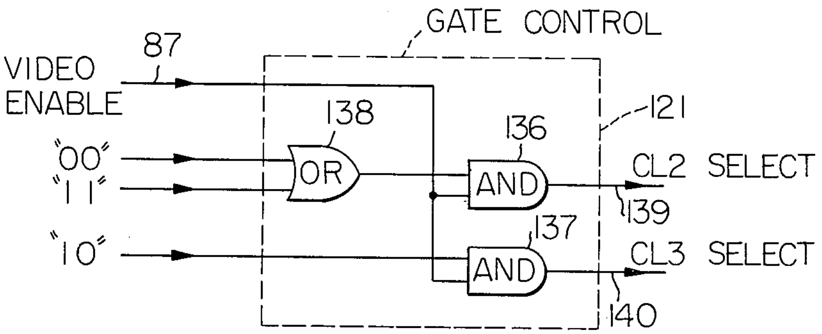
FIG. 8 is a circuit diagram of a gate control circuit of the transmitter of FIG. 1.

In FIG. 8, the gate control circuit 121 comprises AND gates 136, 137 and OR gate 138 and is designed to select one of clock pulses CL2 and CL3 in accordance with the applied codes 00, 11 and 10. Code signals 00 and 11 supplied from the code detector 77 are applied to the AND gate 136 through OR gate 138 to energize lead 139 to select clock CL2, while code signal 10 is applied to the AND gate 137 to energize lead 140 to select clock CL3.

The video enable pulse 87-1 supplied to the clock gate 43 over lead 87 is used to select one of clocks CL6 and CL7. These clocks are used for shifting the code register 61 while video signal stored in the video register 51 is transmitted. Clock CL6 occurs at a rate equal to one-sixteenth of the rate of clock CL2 at which video signal corresponding to codes 00 and 11 is shifted from the video register 51 and clock CL7 occurs at a rate equal to one-sixteenth of clock CL3 at which video signal corresponding to code 10 is shifted for transmission. It will be understood that while the video signal is being shifted, the corresponding code is shifted at a rate equal to one-sixteenth of the rate at which the video signal is shifted.

Upon detection of the recirculated first code by code detector 77, video transmission mode of operation is started. If the first code is either 00 or 11, the clock gate 43 is instructed to select clock pulse CL6 and if 10, the clock gate is instructed to select clock pulse CL7. At the same time, upon selective energization of leads 139 and 140, the clock gate 42 selects one of the clocks CL2 and CL3 which will be applied to the video register 51 through clock distributor 37. Therefore, the corresponding code and video registers are shifted in synchronism with each other at two variable rates.

Assuming that the first code detected is either 00 or 11, the video register 51 is shifted at a clock rate of 1.2288 Mb/s (CL2), while the code register 61 is shifted at a clock rate of 76.8 Mb/s (CL6). Therefore, the first 16 bits of video information is read out from the video register 51 when the first code is read out from the code register 61. Since it is not necessary to transmit video information when code 00 or 11 is detected, the corresponding 16 bits of video information thus read out at a higher rate are disabled by a inhibit signal supplied to the output gate circuit 39 from the gate control 121 over lead 141. If the code detector 77 detects the occurence of code 10 at the next code, the code register 61 is shifted at a clock rate of 150 bits/-seconds (CL7) while the video register 51 is shifted at a rate of 2400 bits/second (CL3). The read out video information will be transmitted on lead 142 through modulator 102 over the transmission channel to the receiver station at a transmission rate of 2400 b/s. These procedures are repeated until the last bit of code is read out from the code register 61. During the video transmission mode, the pulse counter 78 is counting the number of clock pulses CL6 enabled by AND gates 130 and 131 (FIG. 7) when code 11 or 00 is detected, while it counts clock pulse CL7 when code 10 is detected. During the count of 128 bits, all the video information are shifted from the video register 51 and the pulse counter 78 applies a line-end signal 86-1 through Or gate 127 on lead 86 to the register control circuit 24. The line-end pulse causes the video enable pulse 87-1 to fall to zero level and at the same time causes a next sync enable pulse 100-2 to be genreated.

While the first one-line signal is being recirculated, the comparator/detector 19 compares the first and second one-line signals and delivers its compared results to the code register 52 which has been selected as previously described.

On the other hand, if the first line path contains all white areas, the line-all white flip-flop 81 generates a high-level $\overline{Q}$ output through gate 85 and applies it on lead 111 to code generator 109 and to pulse counter 78 when the read-out pulse 47-1 is generated. When this occurs, the 8-bit high-level generator in the code generator 109 (FIG. 6) produces a train of 8-bit 1s which will be delivered on lead 120 to the modulator 102 to the receiver station at a transmission rate of 2400 b/s, while disabling the AND gates 112 to 114 through inverter 112*a*. Simultaneously, the 8-bit counter 135 of the pulse counter 78 is enabled through AND gate 134 and starts counting the clock CL3. After the count of 8 bits, the pulse counter 78 produces line-end pulse 86-1 on lead 86 and resets the flip-flop 81. Upon the occurence of line-end pulse, the read-out enable pulse 76-1 terminates and a next sync enable pulse 100-2 is generated for transmission of the next line signal. It is appreciated that when a one-line all white signal occurs, 2048 bits of 0 are stored in the associated video register, but not transmitted.

The above described procedures are repeated until all the subsequent line paths are scanned.

Figure 9:
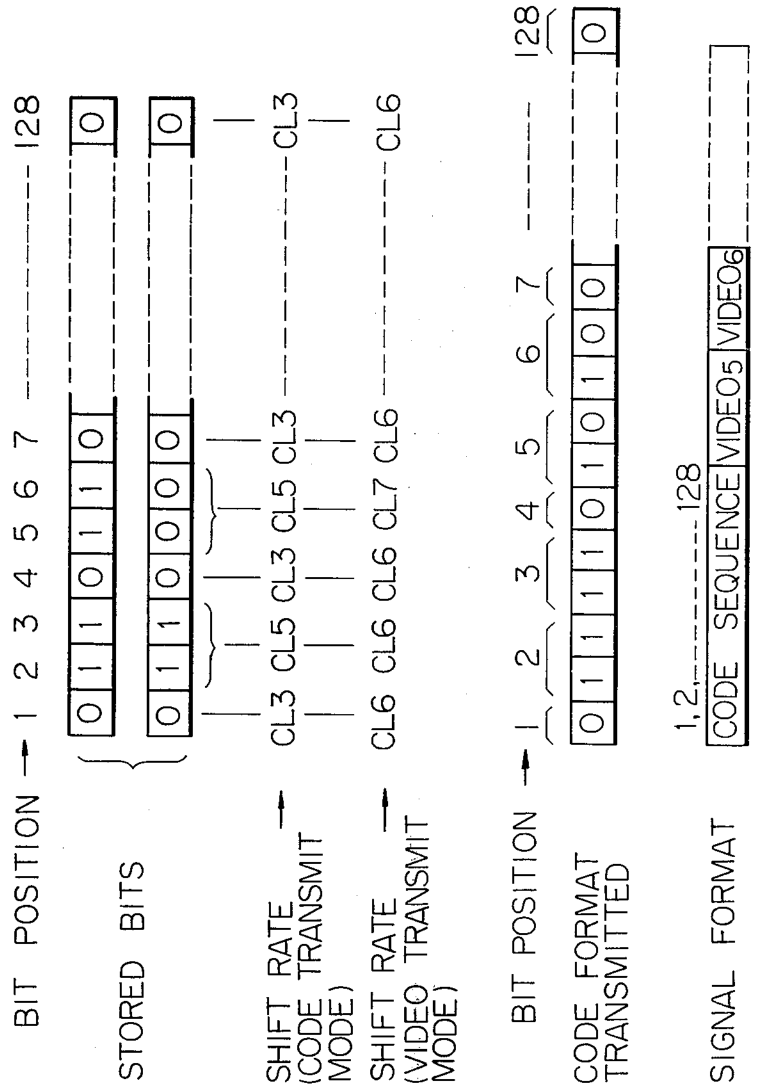
FIG. 9 is an exemplary signal format used in conjunction with the transmitter of FIG. 1, useful for describing the operation of the transmitter.

For better understanding of the transmitter operation, assume that a given line path contain a sequence of code signals as illustrated in FIG. 9. The code register stores 00 bits in the first parallel bit positions, 11 bits in the second and third parallel bit positions, 00 in the fourth, 10 bits in the fifth and sixth bit positions and 00 bits in the seventh bit positions, and so on. During code transmission mode of operation, the first bit positions are parallelly shifted at a rate of 2400 b/s (CL3), the second and third bit positions are shifted at a rate of 1200 b/s (CL5), the fourth bit positions are shifted at a rate of 2400 b/s and the fifth and sixth bit positions are shifted at a rate of 1200 b/s and so on. During the video transmission mode of operation, the first bit positions of the code register are shifted at a rate of 76.8 b/s (CL6) which is one-sixteenth of the rate at which the corresponding video signal is shifted (but in this case not transmitted), the second and third bit positions are shifted at the same rate as the first bit position, and the fifth and sixth bit positions are shifted at a rate of 150 b/s (CL7) which is also one-sixteenth of the rate at which the corresponding video signal is shifted and transmitted, and so on. The code signals are thus transmitted in a sequence of bits representing 128 bit positions. The sequence of codes is followed by a sequence of video signal read out from the video register. However, signal is transmitted only when the code 10 is detected. Therefore, in the example illustrated in FIG. 9, the video signals corresponding to the fifth and sixth bit positions are actually transmitted to the receiver station.

Since the code signals are transmitted in one or two bits, a loss of signal would severely affect the decoding procedure at the receiver station and would result in the disturbance of a complete one-line signal. However, the transmission in sequence of such code signals has an advantage in that it permits insertion of check bits in the code sequence.

Figure 10A:
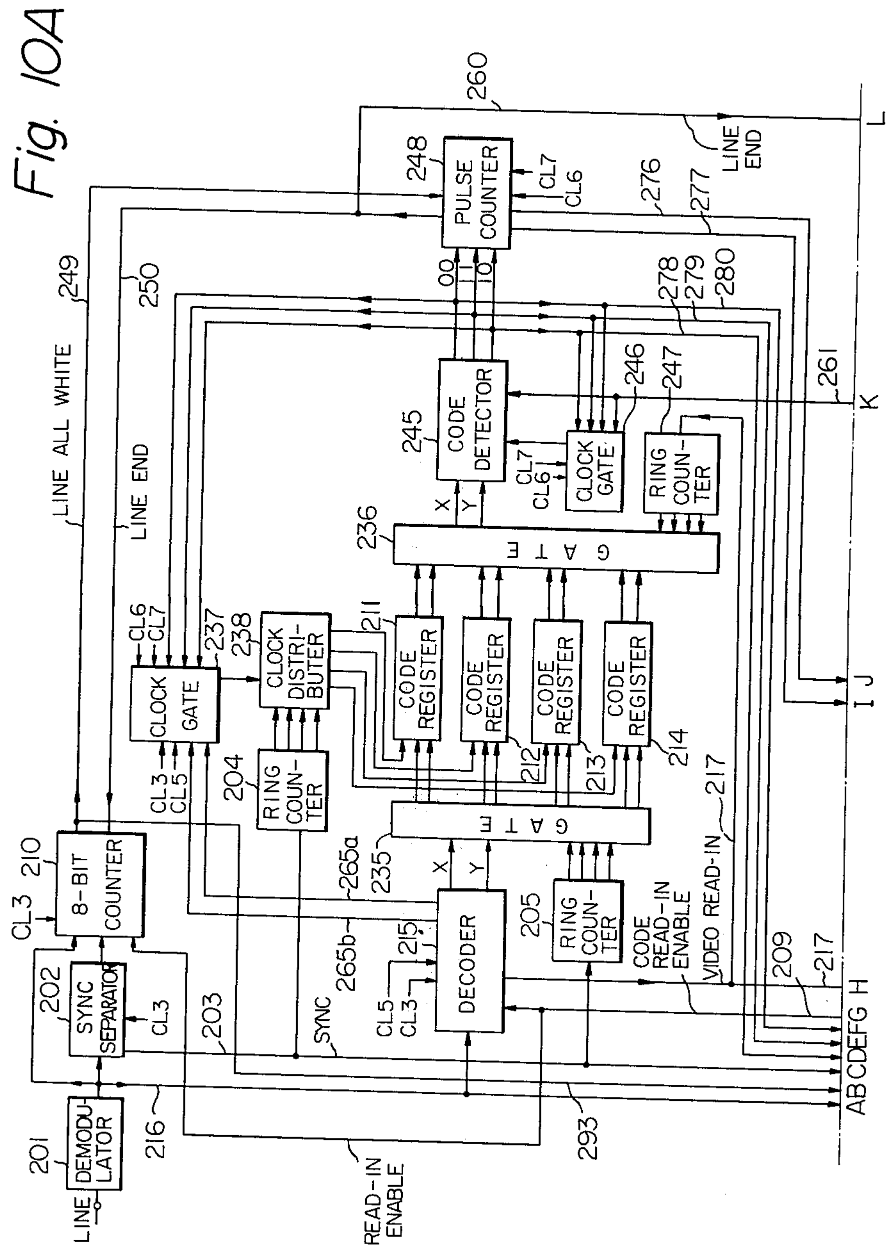
FIGS. 10A and 10B are a circuit block diagram of a receiver portion of the facsimile system in accordance with the invention.
Figure 10B:
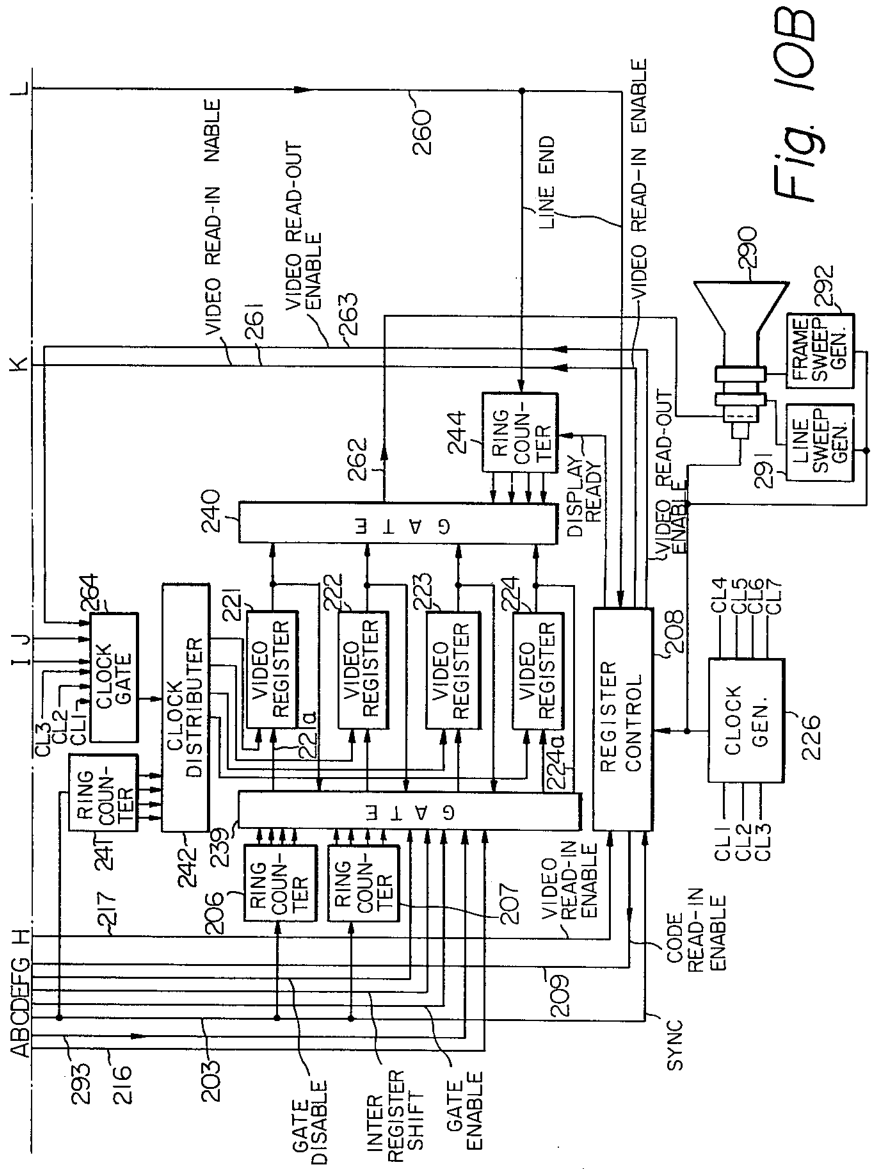

A block diagram of the receiver portion of the facsimile system is shown in FIGS. 10A and 10B. Since the procedure at the receiver is the inverse of that at the transmitter, the operation of the corresponding units is similar to that described above.

Figure 11:
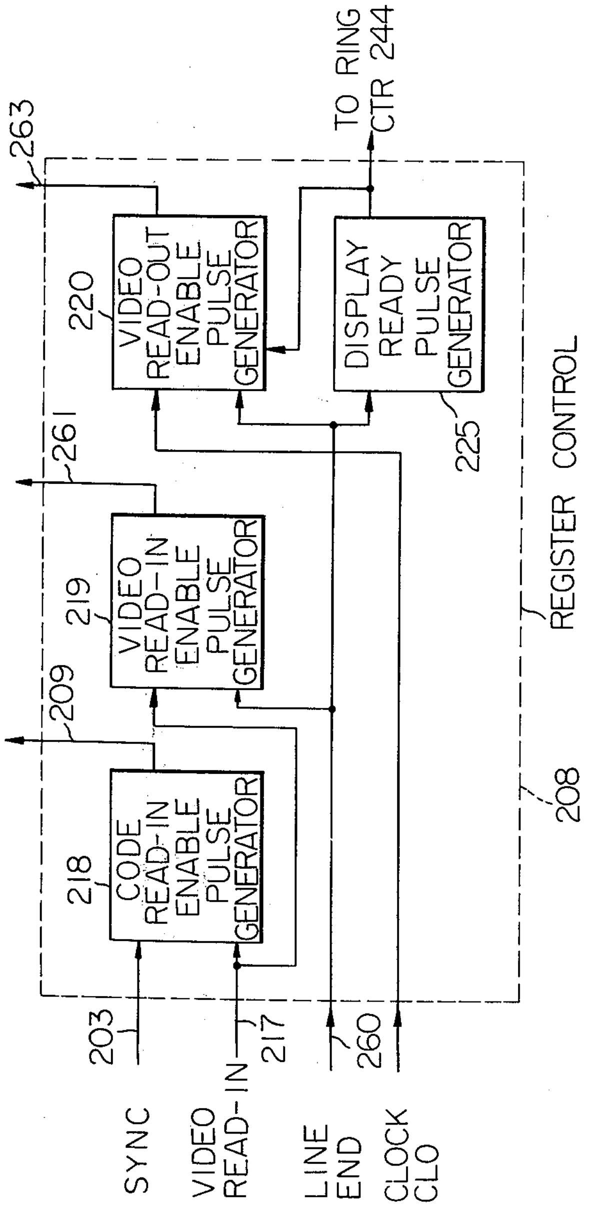
FIG. 11 is a schematic circuit diagram of a register control circuit of the receiver of FIG. 10.
Figure 12:
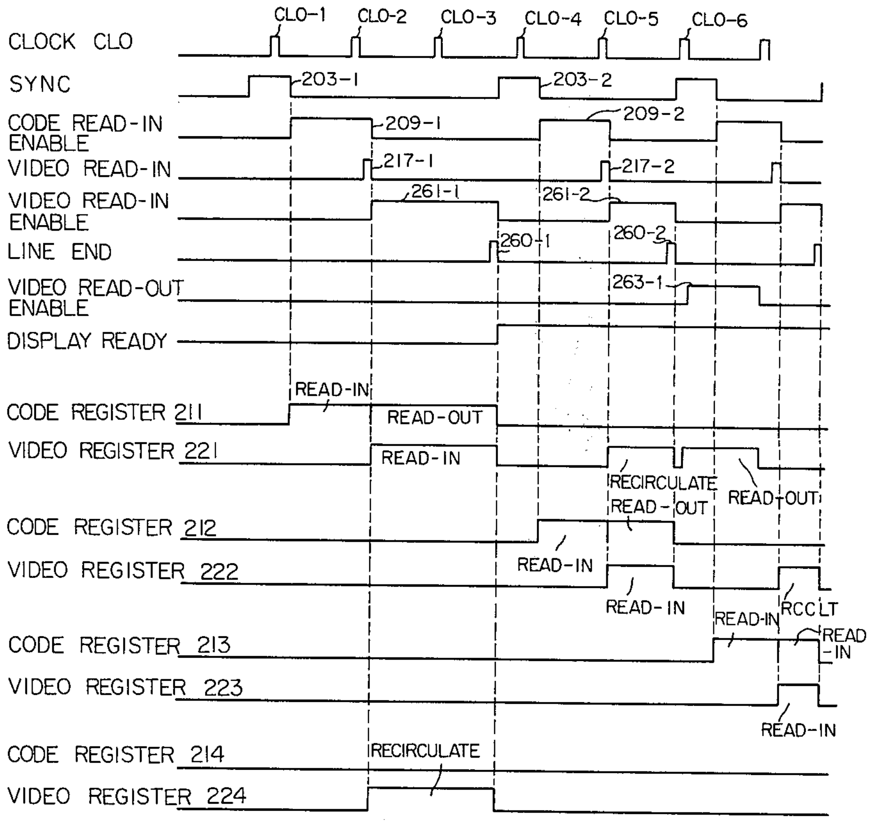
FIG. 12 is a timing diagram of various signal waveforms of the receiver of FIG. 10.

Information received from the transmission channel is passed via the demodulator 201 into sync separator 202 which separates sync pulses from the received information. The separated sync pulse is passed over lead 203 and applied to ring counters 204, 205, 206 and 207 which sequentially distribute their outputs to assiciated circuits, and to a register control circuit 208 which produces in response thereto a code read-in pulse which is in turn applied on lead 209 to a decoder 215 and an 8-bit counter 210. The decoder is thus ready to accept the received information. In FIG. 11, the register control circuit 208 comprises a plurality of pulse generators 218, 219, 220 and 225. The pulse generator 208 produces the code read-in pulse which rises at the trailing edge of the sync pulse and is reset by a video read-in pulse supplied from the decoder as will be described hereinbelow. In response to the video read-in pulse supplied from the decoder 215, the pulse generator 219 produces a video read-in enable pulse having a pulse length determined by a line-end signal supplied from the decoder as will be described later. In response to the line-end signal, a display ready pulse is generated in the pulse generator 225 and energized until all the line signals are received. The pulse generator 220 is energized upon occurance of the display ready pulse from the pulse generator 225 and counts a first line-end signal after occurence of the display ready pulse to produce a video read-out enable pulse at the leading edge of a subsequent clock pulse (CL0) supplied from the clock pulse generator 226 (FIG. 12).

Upon occurence of the code read-in pulse, the decoder 215 starts accepting a sequence of codes. In FIG. 13, the decoder 215 comprises a flip-flop 226 which changes its state only when 1 bit is applied thereto producing a high-level output to AND gate 227. For example, if the received code is 0 which indicates that the corresponding 16 bits of video signal is all 0 bits, a code 00 appears on the XY leads and AND gate 228 is energized. This energizes AND gate 230 at the instant clock CL3 is applied thereto, whereupon the code 00 will be delivered in parallel form from the decoder over the XY leads. If the next code is 11, the flip-flop 226 is energized at a first bit 1 and at this instant both X and Y leads are energized. When this occurs, AND gate 229 is energized in order to pass clock pulse CL5 therethrough. Upon the next 1 bit, flip-flop 226 remains unchanged and upon occurrence of clock pulse CL5 which occurs at an interval twice that of clock CL3, the flip-flop 226 is reset and code 11 will be delivered from the decoder 215 on X and Y leads in parallel form. Assume that the third code is 10, the flip-flop 226 will remain unchanged, but a bypass circuit 234 which couples the input lead 216 to AND gate 227 will cause the Y lead to be deenergized while the AND gate 229 remain energized to pass clock pulse CL5. Upon occurrence of clock CL5, the flip-flop 226 will be caused to be reset, thereby producing 10 code in parallel form on the XY leads. The decoder 215 further comprises a 128-bit counter 233 in which clock pulses (CL3 or CL5) are counted on a one-bit-for-each-code basis. When all the 128 bits have been counted, the counter produces a video read-in pulse which is applied on lead 217 to the register control circuit 208 in which a video read-in enable pulse will be generated as previously described.

When the sync pulse is applied on lead 203, the ring counter 206 energizes one of its output leads to provide access in the gate circuit 239 for the video portion of the received signal to video register 221, and the ring counter 207 prepares an inter-register path between the output lead 224*a* of video register 224 and the input lead 221*a* of video register 221. The recirculating path will be shifted from one register to another upon application of a sync pulse in a manner similar to that at the transmitter. At the same time, the ring counter 241 energizes the clock distributor 242 to select a pair of paths for clock pulses supplied from clock gate 264 to the video registers 221 and 224. The sync pulse is also applied to ring counters 205 and 204 to selectively provide access in the gate circuit 235 and clock distributor 238, respectively, to the code register 211 both for the decoder and clock gate outputs.

While the decoding procedure continues, the decoded signals are gated through the gate circuit 235 into the code register 211 having a 218-bit positions in parallel form for storage of the code bits passed over the XY leads in parallel form. The decoder 226 energizes lead 264 when code 00 is delivered therefrom and energizes lead 265 when code 11 or 10 is delivered. The selective energization of leads 265*a* and 265*b* causes clock gate 237 to gate clock CL3 or CL5 onto code register 211 via the clock distributor 238 which has set up a path therebetween by the ring counter 204 upon the sync pulse.

Upon occurrence of the video read-in pulse from the decoder 215, ring counter 247 will be energized to set up a path in the gate 236 to shift the contents of code register 211 to code detector 245. When this occurs, the first paired bits of the right-most position of the code register 211 appear at the XY input leads of the code detector 245.

In response to the video read-in pulse, a video enable pulse occurs which energizes the code detector 245 to initiate detection of the XY code to determine what information is to be stored in the video register 221. The code detector 245 which is similar in construction to the code detector 77 of the transmitter shown in FIG. 5 detects the occurrence of codes and selectively energizes one of the output leads 00, 11 and 10 in accordance with the detected code, and passes the output to a pulse counter 248.

Assuming that the received signal contains bits as shown in FIG. 9 as transmitted from the transmitter, the pulse counter 248 receives a signal on the 00 lead for the first code. In FIG. 14, the pulse counter 248 comprises a 128-bit counter 271 which counts clock pulses CL6 through AND gate 273 as long as the 00 input is energized to develop a clock select signal on lead 276 to instruct the clock gate 264 to select clock CL2 to be supplied to video register 221 to read in the video portion of the signal corresponding to the first code. On the other hand, the code detector 245 instructs clock gate 237 to select clock pulses CL6 at which the first parallel bits 00 are shifted from the code register 211. Further, the code detector 245 provides a gate control signal to the input gate circuit 239 over lead 278 to disable the gate 239 to disconnect the access path between the input lead 216 and video register 221 and the inter-register path between the latter and video register 224, so that a sequence of 16 bits of 0 is read into the video register 221, while 16 bits of the right-most positions of the video register 224 are emptied at the same rate as at the video register 221. Therefore, the left-most 16 bit positions of the video register 221 are filled with all 0 bits at a rate 16 times higher than the rate at which the first code bits 00 are shifted from the code register 211. For the second and third codes, the 11 input lead is energized and 16 pulses of clock CL6 are counted twice in the pulse counter 248 while the code detector 245 energizes lead 279 to instruct the gate circuit 239 to enable the inter-register path to shift the contents of video register 224 into video register 221 by clock pulses CL2 which are enabled by clock select signal provided on lead 276 from pulse counter 248. Therefore, corresponding 16-bit positions of the previous line path stored in video register 224 has been emptied therefrom and stored in video register 221. For the fourth code 00, the same procedure is repeated as for the first code and another sequence of 16 bits of 0s are read into video register 221. For the fifth and sixth codes, code detector 245 energizes lead 10 to enable the gate 239 over lead 278 to set up access between the lead 216 and video register 221 and to disconnect the inter-register path, while the pulse counter 248 provides clock select signal on lead 277 to instruct clock gate to select clock pulses CL3. Two sequences of 16 bits of video information appear on the input circuit 216 and are sequentially fed into video register 221 through gate circuit 239 at a rate of 2,400 b/s in synchronism with the incoming video pulses. Simultaneously, video register 224 is shifted at the same clock rate during this period. The procedures as described above will be repeated until all the bit code stored in the code register 211 has been processed. It is to be noted that the video register, when reading the regenerated video information, is shifted at a rate 512 (CL2/CL3) times higher than the rate at which the video register is shifted when reading the transmitted video information, and therefore, the video information corresponding to codes 00 and 11 is regenerated well in advance of the incoming video information corresponding to code 10.

When all bits of information have been counted in the pulse counter 248, a line-end signal will be produced which is applied on lead 260 to the register control circuit 208, ring counter 244 and to 8-bit counter 210. Upon occurrence of the line-end pulse, the video enable pulse is removed from code detector 245 and clock gate 246 and a display ready pulse is applied to ring counter 244 to enable the same at the next line-end pulse.

Therefore, when the first one-line signal has been read into the video register 221, a next sync pulse 203-2 (FIG. 12) will appear on lead 203 preceding the second one-line information. A code read-in pulse is generated in response thereto and the associated ring counters advance their outputs to the next position and the code information is decoded by the decoder 215 and subsequently stored this time in code register 212. After storage of the decoder output in the code register 212, the decoder 245 produces a video read-in pulse 217-2 which serves to advance ring counter 247 to the next position and a video read-in enable pulse 261-2 is generated which initiates detection of stored bit information in the code register 212.

Meanwhile, upon occurrence of the sync pulse 203-2, ring counter 206 advances its output to the next position to select video register 222, and ring counter 207 advances its output to the next position so that an inter-register path is set up between the video registers 221 and 222 and a recirculating circuit which couples the output and input of the video register 221. Ring counter 241 is also advanced so that a clock-transmit path is set up in the clock distributor 242 between video registers 221 and 222 and clock gate 264.

As soon as the code detector 245 produces its output, the gate circuit 239 is selectively controlled to read in a sequence of 16 bits of video information in accordance with the detector output. As previously described, video portion of the second line signal is read into the video register 222. If the detector output is 00, the inter-register path as referred to above is disconnected by the control signal applied on lead 280 and a sequence of 16 bits of 0 is read into video register 222 by clock pulses CL2, while the stored information in the video register 221 is recirculated therein through the recirculating circuit by the same clock pulses. If the next detector output is 11, the inter-register path is connected or enabled by a control signal applied on lead 279, so that the right-most 16 bits of stored information in the video register 221 are shifted into the video register 222 by clock pulses CL2, while the shifted bits are simultaneously recirculated in the video register 221 by the same clock pulses. Assume that the third decoder output is 10, the inter-register path is again disconnected by a control signal applied on lead 278 and a sequence of 16 bits of received video information is accepted into the video register 222 by clock pulses CL3, while video register 221 is shifted by the same clock pulses through the recirculating path. These procedures are repeated until all the bits in the code register 212 have been processed, whereupon a line-end pulse 260-2 is delivered from the pulse counter 248.

Upon occurrence of the line-end pulse 260-2, a video read-out enable pulse 263-1 is generated in the pulse generator 220 of register control circuit 208 so that the recirculated video register 221 may be read out to be fed into a display device 290. The video read-out enable pulse is applied on lead 263 to clock gate 264 to select clock pulse CL1 and the recirculated information is sequentially shifted from video register 221 at a clock rate of 409.6 kb/s (CL1) and delivered on lead 262 to a control electrode of the display device 290 which may be a conventional cathode ray tube. The signal impressed on the display tube 290 is utilized in conventional manner to modulate the intensity of the cathode ray beam and scanned at a line sweep rate of 200 lines/second by a line sweep generator 291 and the scanned lines are shifted to the next by a frame sweep generator 292 with clock pulses CL0 from the clock generator 226.

In the foregoing, the description has proceeded with the assumption that the scanned line path is not all white. If, however, the scanned line path is all white, a sequence of 8 bits of 1 is received after occurrence of a sync pulse and counted by 8-bit counter 210 which may comprise an 8-bit shift register driven by clock pulses CL3. The 8-bit counter 210, upon detecting the occurrence of a sequence of 8 bits of 1, applies a line-all-white signal on lead 293 to the gate circuit 239 to disable the inter-register path (between registers 221 and 222) as well as to disable the input access path to the video register 222 so that a sequence of 0s may be stored in the register 222. The line-all-white signal is also applied on lead 249 to the pulse counter 248 which is caused to count clock pulses CL6. When a count of 128 is reached, the pulse counter 248 applies a line-end signal on lead 250 to the 8-bit counter 210 so as to remove the line-all-white signal. While the counting proceeds, the pulse counter 248 energizes lead 276 in order to select clock pulse CL2 by which the video register 222 is shifted to read therein a sequence of 2,048 bits of 0s. At the same time, the video register 221 is recirculated by the same clock pulse for later use.

In summary, at a transmitter station, line paths within a two-valued object filed such as graphical or printed document are sequentially scanned at a first rate (200 lines/sec) by means of a flying spot scanner, for example, with a light-sensitive transducer to generate a sequence of one-line video signals. Each of the one-line signal is sampled at a second rate (409.6 kb/s) into a series of 128 groups of 16 bits, a total of 2048 bits. Each of the 16 bits of a given line path is compared with each of the corresponding 16 bits of the previous line path to develop first coded information when coincidence occurs therebetween and second coded information when coincidence does not occurs. A detector is preferably provided which detects the occurrence of a predetermined level to develop third coded information regardless of the comparison when said each of the bit groups consists of a sequence of all white areas (background areas). The 2,048 bits of video information and the 128 bits of coded information are stored in synchronism into a first and a second memory, respectively. The first memory may comprise groups of shift registers each having a storage capacity of 2,048 bits and the second memory may comprise groups of shift registers each having a storage capacity of 128 bits. After storage of the coded and video information, the video information is recirculated when the next one-line signal is stored into the first memory for pusposes of comparison with the next one-line signal in a manner similar to that described above. At this instant, a synchronization signal is transmitted to a receiver station. Next, the coded information now stored in the second memory is transmitted in sequence while it is recirculated in the second memory. A code detector is provided which identifies the recirculated coded information to generate control signals to the first memory. After transmission of the coded information, the video information now stored in the first memory will be enabled by the control signal and transmitted when the second coded information is identified by the code detector. The transmitter may be further provided with a line-all white detector which develops a fourth coded information when a sequence of 2,048 bits of 0 or white areas is detected. The fourth coded information is transmitted while inhibiting the other coded information as well as the video information.

At the receiver station, the sequence of coded information is first stored into a third memory, the counterpart of the second memory at the transmitter. After the storage of the coded information, the stored bits of coded information are identified or detected to determine what information bits are to be stored into a fourth memory, the counterpart of the first memory at the transmitter. When the first coded information is detected, a series of 16 bits of the previous line path is transferred into one of the shift registers of the fourth memory. When the second coded information is detected, the 16 bits of video information transmitted from the transmitter are accepted by the fourth memory. Upon occurrence of the third coded information, 16 bits of 0 are stored into the fourth memory. If a line-all white information is received, a sequence of 2,048 bits of 0 will be stored into the memory. After storage of the video information, thus recovering the original one-line signal, the stored bits will be recirculated when the video information of the next line path will be recovered. After recirculation, the recovered one-line signal will be read out to be converted into a visual image.

These procedures as described above are repeated until all the line paths contained in the document are scanned.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A method of transmitting signals representative of the light values of a two-valued object field, comprising the steps of: sequentially scanning line paths within the two-valued object field to generate a one-line signal; storing the one-line signal; segmenting the one-line signal; repeatedly comparing each of the segments of the one-line signal of a given line path with each of the segments of the one-line signal of an adjacent line path to generate a sequence of first and second codes, the first code being generated upon occurrence of coincidence therebetween and the second code upon occurrence of non-coincidence therebetween; transmitting said first and second codes in sequence; detecting the occurrence of said second code, and transmitting a segment of the one-line signal when said second code is detected.

2. A method as claimed in claim 1, wherein a third code is generated when said each of the signal segments of the given line path consists of a sequence of a predetermined level, said third code being transmitted with said first and second codes in sequence.

3. A method as claimed in claim 2, wherein a fourth code is generated when the one-line signal consists of a sequence of said predetermined level, said fourth code inhibiting the transmission of each of the segments of the one-line signal.

4. A method of transmitting signals representative of the light values of a two-valued object field between a transmitter and a receiver station, comprising at said transmitter station the steps of:

a. sequentially scanning line paths within the two-valued object field with a light-sensitive transducer to generate a one-line signal;

b. sampling the one-line signal at a constant rate thereby producing sampled binary pulses indicating black and white areas;
c. storing the binary pulses of a given line path;
d. reading out the stored binary pulses of a previous line path;
e. comparing a predetermined number of pulses of said given line path with the predetermined number of the read out pulses of said previous line path to generate a first code element upon occurrence of coincidence therebetween or a second code element upon occurrence of non-coincidence therebetween, the predetermined number being $1/n$ of the number of the sampled pulses in a single line path, wherein $n$ is an integer greater than two;
f. repeating the step of (e) $n$ times;
g. recirculating the stored binary pulses of said given line path when the sampled binary pulses of a subsequent line path are being stored;
h. transmitting said code element in sequence to said receiver station;
i. simultaneously storing said code elements in sequence;
j. reading out said stored code elements;
k. detecting the occurrence of said first and second code elements;
l. simultaneously with the step of (j), reading out said stored binary pulses of said given line path;
m. enabling the read out binary pulses upon detection of said second code element or disabling the same upon detection of said first code element; and
n. transmitting the enabled pulses to said receiver station.

5. A method as claimed in claim 4, further comprising the steps of detecting the occurrence of a predetermined level to generate a fourth code element when all of the sampled pulses of a one-line signal consist of said predetermined level; and transmitting said fourth code to said receiver station; and disabling the step of (j).

6. A method as claimed in claim 4, further comprising the steps of counting the number of said code elements and generating a synchronization signal.

7. A method as claimed in claim 4, wherein, in the step of (1), the stored pulses are read out at a first rate when said first code element is detected and at a second rate lower than said first rate when said second code element is detected.

8. A method as claimed in claim 4, further comprising, at said receiver station, the steps of:
a. storing said first and second code elements of said given line path into a first memory;
b. detecting the occurrence of said first and second code elements;
c. shifting the binary pulses of said previous line path stored in a second memory to said first memory upon occurrence of said first code element or storing the transmitted binary pulses upon occurrence of said second code element;
d. recirculating said stored binary pulses when the binary pulses of said subsequent line path are being stored; and
e. converting said stored binary pulses of said given line path into visual image.

9. A method as claimed in claim 4, further comprising the step of detecting the occurrence of a predetermined level to generate a third code element when the predetermined number of binary pulses of said given line path consist of a predetermined level.

10. A method as claimed in claim 9, wherein said second code element is generated when said predetermined number of binary pulses of said given line path neither consist of a sequence of said predetermined level nor coincide with the predetermined number of read out binary pulses of said previous line path.

11. A visual communication system for the transmission of signals representative of the light values of a two-valued object field between a transmitter and a receiver station, means at said transmitter station for sequentially scanning line paths within said two-valued object field with a light-sensitive transducer to generate a one-line signal, means for sampling said one-line signal into a plurality of binary pulses; first storage means arranged to store said binary pulses as a sequence of bits and drivable at a first clock rate; comparator means supplied with the sampled binary pulses from said sampling means and with the stored bits from said first storage means for developing first and second code elements upon the occurrence of coincidence in levels therebetween; second storage means arranged to store said code elements and drivable at a second clock rate lower than said first clock rate; and detector means supplied with said code elements driven from said second storage means for developing a control signal to said first storage means.

12. A visual communication system as claimed in claim 11, wherein said comparator includes second detector means for detecting the occurrence of a sequence of a predetermined level to develop a third code element.

13. A visual communication system as claimed in claim 11, further comprising third detector means for detecting the occurrence of a sequence of a predetermined level to develop a fourth code element when all of the sampled binary pulses of the one-line signal are at said predetermined level.

14. A visual communication system as claimed in claim 11, wherein said first and second clock rates are variable depending on the occurrence of said first and second code elements.

15. A visual communication system as claimed in claim 11, wherein said first storage means includes a recirculating circuit coupling the output and input thereof.

16. A visual communication system as claimed in claim 15, wherein said first storage means comprises a plurality of shift registers each being arranged to store binary pulses of a one-line signal.

17. A visual communication system as claimed in claim 11, further comprising, at said receiver station, third storage means arranged to store said binary pulses and drivable at said first clock rate, fourth storage means arranged to store said code elements and drivable at said second clock rate, fourth detector means for detecting the occurrence of said code elements to generate a control signal to said third storage means.

18. A visual communication system as claimed in claim 17, wherein said third storage means comprises a plurality of shift registers.

19. A visual communication system as claimed in claim 18, wherein said third storage means further comprises an input gate arranged to selectively provide access path to said shift registers and an output gate coupled to said fourth detector.

20. A visual communication system as claimed in claim 19, wherein a third recirculating circuit is provided between the output and input of each of said shift registers through said input gate.

21. A visual communication system as claimed in claim 11, wherein said second storage means includes a second recirculating circuit coupling the output and input thereof.

22. A visual communication system as claimed in claim 21, wherein said second storage means comprises a plurality of shift registers each being arranged to store said first and second code elements derived from a one-line signal.

23. A visual communication system as claimed in claim 22, wherein said first storage means includes an input gate coupled to said sampling means and an output gate coupled to a transmission channel.

24. A visual communication system as claimed in claim 23, wherein said recirculating circuit is established through said input gate.

25. A visual communication system as claimed in claim 22, wherein said second storage means includes an input gate coupled to the output of said comparator means and an output gate coupled to the input of said first detector means.

26. A visual communication system as claimed in claim 25, wherein said second recirculating circuit is established through said input gate.

* * * * *